United States Patent Office 3,686,160
Patented Aug. 22, 1972

3,686,160
PROCESS FOR THE POLYMERIZATION OF ETHYLENE COMPRISING THE SIMULTANEOUS USE OF TWO ZIEGLER-TYPE CATALYST COMPLEXES
James V. Cavender, Jr., Texas City, Tex., assignor to Monsanto Company, St. Louis, Mo.
No Drawing. Filed Sept. 28, 1970, Ser. No. 76,289
Int. Cl. C08f 1/42, 3/06
U.S. Cl. 260—94.9 B        5 Claims

ABSTRACT OF THE DISCLOSURE

Polyolefins particularly suited for blowing into bottles are prepared by polymerizing olefins using a Ziegler-type catalyst which is prepared either by (1) combining a first stream of a complex comprised of an admixture of an organometallic compound, such as an organoaluminum compound, and a reducible heavy metal compound, such as a salt of titanium, in which the mole ratio of metal in said organometallic compound to the metal in said reducible heavy metal compound is relatively high and a second stream of a complex comprised of a similar admixture of compounds except that the mole ratio of the metallic constituents is relatively low and feeding the combined stream continuously to the polymerization zone or (2) feeding two such complex streams directly into the polymerization zone.

BACKGROUND OF THE INVENTION

The present invention relates to the polymerization of olefins at relatively low presures for the production of high-density olefin polymers of high molecular weight and, more particularly, to the praparation of such ethylene polymers having improved physical properties or characteristics.

It has been well known for some time now that ethylene and other olefins can be polymerized alone to produce homopolymers or in combination to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal in combination with various reducible heavy metal compounds such as the halides, alkoxides, acetylacetonates, etc., of the metals of Groups IV–B, V–B, VI–B and VIII of the periodic system. Among the most active types of catalyst for this reaction are those consisting of a reduced titanium halide in the presence of an organoaluminum compound such as alkylaluminum alkyls, alkylaluminum hydrides, alkyl alkylaluminum halides and the like as an activator. Particularly preferred are catalysts containing $TiCl_4$ with an alkyl aluminum compound such as a trialkyl aluminum, a dialkyl aluminum halide or a dialkyl aluminum hydride, for example.

With the catalyst just described, high yields of good quality, high-molecular-weight, solid polymers of ethylene and other olefins have been produced. Generally, these polymers are of high density, i.e., 0.93 and above, with the molecular weight of the polymers falling within a wide range from 2,000 to 300,000 and even as high as 3,000,000 or more. Thus, from the standpoint of density and molecular weight requirements, these polymers are satisfactory for many uses. However, polymers suitable for processing into bottles such as those employed, for example, as containers for milk, require in addition to high density, i.e., a density of 0.96 or more, a high memory. Memory is a property of the polymer which is related to its high-shear sensitivity. High-shear sensitivity is important to the plastic fabricator in that high extrusion rates may be obtained from a given shear stress thereby improving the workability of a polymer, i.e., less work need be done on the polymer to obtain a given degree of output of the fabricated articles. Polymers of suitable density and molecular weight but too low in elastic memory cannot be successfully blown into certain types of bottles because they fail to swell sufficiently with the result that the molds do not fill completely to produce the desired shapes or they exhibit melt fracture at high bottle blowing shear rates possibly because of an inherently narrow molecular weight distribution. On the other hand, resins which possess too high an elastic memory are also unsuitable as bottle stock because they exhibit high shrink-back which causes contraction of the parison and make bottle weight difficult to control. It has been determined from experience that suitable polymers, assuming these have a nominal $MI_2$ of 1.0, are those having a memory at 4690 sec.$^{-1}$ in the range from 154 to 174%. Thus, a delicate balance of density and memory in the polymer is required.

Various techniques are known for controlling density and improving memory. For example, the ratio of organometallic compound to the reducible heavy metal compound in the Ziegler- or coordination-type catalyst can be used to control memory. However, this is usually accomplished at the expense of density. When the memory is high enough to be acceptable, the density is too low to be acceptable; conversely, adjustment of this ratio which provides for acceptable density values results in memory which is too low. One other aproach that has been used to handle the density-memory problem is that of mechanical blending of individual polymers or resins with high memory characteristics with other polymers or resins having the required high density characteristics. The disadvantages of this approach are immediately obvious. The polyblending technique necessitates making two polymers in order to get one and the blending procedures necessarily increase the cost of the product. There is some degradation, too, in memory to be expected as a result of the polyblending operation which frequently results in what would otherwise be an acceptable blend. The present invention overcomes these drawbacks and affords various other advantages which will be apparent from the following description thereof.

SUMMARY OF THE INVENTION

According to the present invention olefin polymers, particularly ethylene polymers and copolymers, having physical properties which make them especially suitable or useful for blowing into bottles are obtained by polymerizing an olefin or a mixture of an olefin and another polymerizable monomer in a polymerization zone in an inert reaction medium at polymerization temperatures in the presence of a catalyst which is formed by combining a first stream of a complex comprised of an admixture of an organometallic compound of an alkali metal, alkaline earth metal, zinc, earth metal or a rare earth metal and at least one reducible heavy metal compound which is a halide, an alkoxide, an acetyl acetonate, etc., of the metals of Group IV–B, V–B, VI–B and VIII of the Periodic Table, the mole ratio of said organometallic compound to said reducible heavy metal compound being in the range of 2.2 to 4, and a second stream of a complex comprised of an admixture of one of said organometallic compounds and at least one of said reducible heavy metal compounds, the mole ratio of said organometallic compound to said reducible heavy metal compound being in the range from about 0.5 to about 0.8, and feeding said combined stream continuously to said polymerization zone. Alternatively, the two catalyst complex streams can be fed separately to the reactor. The catalyst complex stream or streams are fed to the polymerization zone as liquid streams each of which comprises an inert liquid medium, generally one suitable for use as a polymerization medium, having the catalyst-forming ingredients dispersed therein. In the preferred embodiment of the invention, both catalyst complex streams comprise an organoaluminum compound and at least one titanium salt such as titanium tetrachloride or titanium trichloride with said first catalyst complex stream constituting from about 5 to about 20% by weight and said second catalyst complex stream constituting the remaining 95% to 80% by weight of the total catalyst complex charged to the reaction zone.

DESCRIPTION OF THE PREFERRED EMBODIMENTS

The invention is illustrated in the following example which is not intended to be construed as limiting it in any manner whatsoever.

EXAMPLE

Ethylene was polymerized in a series of polymerization runs using a Ziegler- or coordination-type catalyst. In some of the runs, a single stream of catalyst complex with various ratios of organo-aluminum compound to titanium compound was employed; in other runs, two streams of catalyst complex having different ratios of organoaluminum compound and titanium compound were employed. These polymerizations were carried out in a reactor consisting of a jacketed section of 8-inch, schedule-20, stainless-steel pipe with a welded elliptical bottom and a flanged elliptical head. Baffles and a triple turbine assembly were used to provide agitation. Overall reactor length was 2 feet 3 inches and total volume was about 3 gallons.

Each catalyst complex stream was prepared in a separate vessel, hereinafter referred to as a complexer, having two or more interconnected chambers and equipped with inlet means for introducing the catalyst reactant and liquid vehicle, means for agitation and thorough mixing of the complex constituents and outlet means for removal of reacted material and liquid vehicle. The suitable titanium halide such as titanium tetrachloride dissolved in a liquid vehicle such as hexane after it had passed through a rotometer was pumped continuously into the complexer. A solution of the organoaluminum compound such as diisobutylaluminum hydride in hexane was also continuously metered and pumped through a separate inlet into the complexer. As the particulate catalyst was formed in the complexer, it became dispersed in the hexane and was further mixed with additional hexane which had been admitted to the complexer. After a suitable aging time, i.e., sojourn time in the complexer, the mixture was either continuously fed from a single complexer into the feed line to the reactor or streams of the complex mixture were continuously removed from each of two complexers, combined and charged to the polymerization reactor at the desired rate.

The reactor was conditioned by cleaning, purging with hot ethylene or nitrogen to establish operating levels of water and oxygen at approximately 5 and 2 p.p.m., respectively, and charged with approximately one liter of hexane, the reaction medium. The catalyst complex was charged below the liquid surface from the complexer or complexers, as the case might be. Ethylene was then charged to the reactor at a rate to maintain reactor pressure within the desired range. Hydrogen employed as a molecular weight controller was metered to the reactor from a cylinder with pressure regulated to 125 p.s.i.g. after deoxygenation by passage through a column containing a supported copper oxide followed by passage through a drying column.

At the end of the polymerization reaction, the slurry from the reactor was discharged into collection vessels where it was quenched with methanol, the resulting slurry was heated to 95° C. for 30 minutes, then cooled and transferred into 2-gallon, stainless-steel sample containers for subsequent transfer to a Büchner funnel. The finishing steps consisted of filtration, washing, and stabilization, all accomplished in a large Büchner funnel. Methanol and hexane were used for washing the polymer and a solution of a phenolic anti-oxidant was employed for stabilization. The polymer was dried and a 200-g. portion was employed for determination of physical properties. Operating conditions and evaluation data for the several runs made are given in Table I.

The following methods were employed in determining the polymer properties. Melt index ($I_2$) was determined by ASTM Test D–1238–65T using a 2160-gram weight. Melt extrusion rate ($I_{10}$) was determined using the same method employed for determination for melt index except that the weight on the sample was 10 kg. ASTM Test D–792–60T was employed for determining density. Memory was determined by operating a melt rheometer at a temperature of 200° C., using a capillary with an internal diameter of 0.025 in., a land length of 0.1 in. and an entrance angle of 30°–10. The rheometer plunger was set to force the polymer melt through the capillary at several speeds which would produce shear rates calculated at from 25 to about 12,000 sec.$^{-1}$. At each speed, the extrudate diameter was measured to calculate a memory value. Memory is defined as $$\frac{D_e - D_0}{D_0} \times 100$$

where $D_e$ is the diameter of the extrudate and $D_0$ is the diameter of the capillary. All memory values reported in the table were measured at 4690 sec.$^{-1}$ since it has been found most convenient to use this memory in view of its correlation with shear rates used in some commercial blowing plants.

It will be seen from Table I that while the memory of the polymer from Run No. 1 is in the acceptable range, the density is below that deemed suitable. That the density can be controlled at the desired level by proper regulation of the Al/Ti ratio is evident from the polymer made under the conditions of Run No. 3 wherein the Al/Ti ratio was increased to 1.0. However, the memory of this polymer does not meet the specified standards. It is too low. The "dual complexing" technique of the present invention, on the other hand, provides polymer which is satisfactory from the standpoint of both density and memory as is evident from consideration of the properties of the polymers produced in Runs 5–7. Noteworthy is the fact that this difference in properties is achieved despite the fact that the Al/Ti ratio in the reactor or reaction zone is essentially the same as that employed when only a single complex is used. While the phenomenon is not thoroughly understood, the effect is believed to result from the presence of different species of active sites in the reactor where polymerization occurs.

TABLE

| Run number | 1[1] | 2 | 3 | 4 | 5 | 6 | 7 |
|---|---|---|---|---|---|---|---|
| Complexing conditions: | | | | | | | |
| *Complexer 1:* | | | | | | | |
| Ti, mmole/l | 38.9 | 45 | 31 | 44 | 1.7 | 1.66 | 3.4 |
| Al/Ti ratio | 0.716 | 0.9 | 1.0 | 1.4 | 2.7 | 3.6 | 2.2 |
| Temperature, °C | 44 | 27 | 45 | 50 | 30 | 45 | 29 |
| Age, minutes | 19.1 | 20 | 14 | 20 | 5.0 | 4.9 | 5 |
| Percent of Ti | 100 | 100 | 100 | 100 | 10 | 10 | 20 |
| *Complexer 2:* | | | | | | | |
| Ti, mmol/l | | | | | 17 | 16.7 | 15 |
| Al/Ti ratio | | | | | 0.7 | 0.6 | 0.76 |
| Temperature, °C | | | | | 27 | 45 | 26 |
| Age, minutes | | | | | 5.5 | 5.5 | 5.4 |
| Percent of Ti | | | | | 90 | 90 | 80 |
| Reaction conditions: | | | | | | | |
| Ti, mmol/l | 3.76 | 2.0 | 2.0 | 2.0 | 3.0 | 3.0 | 3.0 |
| Al/Ti ratio | 0.716 | [2] 0.9 | 1.0 | 1.4 | 0.9 | 0.9 | 1.0 |
| Temperature, °C | 79 | 80 | 81 | 80 | 71 | 79 | 72 |
| Pressure, p.s.i.g | 50 | 30 | 37 | 27 | 34 | 30 | 26 |
| H$^2$ in cycle gas, percent | 44 | 15 | 66 | 56 | 52 | 58 | 56 |
| Polymer properties: | | | | | | | |
| Melt index (I$^2$) dg./minutes | 1.05 | 1.1 | 0.9 | 1.5 | 1.8 | 0.91 | 1.1 |
| Melt flow (I$^{10}$/I$^2$) | 12.6 | 17.4 | 13.0 | 13.7 | 16.4 | 15.1 | 11.5 |
| Density, g./cc | 0.9585 | 0.9574 | 0.9633 | 0.9647 | 0.9614 | 0.9611 | 0.964 |
| Memory at 4,690 sec.$^{-1}$, percent | 167 | 183 | 140 | 140 | 170 | 170 | 160 |

[1] Isobutanol added in complexer as modifier to provide ROH/Ti ratio of 0.29.
[2] Triisobutylaluminum replaced diisobutylaluminum hydride as organoaluminum compound.

The present invention is broadly applicable to the preparation of all Ziegler-type solid polymers, i.e., all solid polymers prepared by polymerizing a monomer or mixture of monomers in the presence of a Ziegler-type catalyst. It is particularly suited for use with polymers prepered by polymerizing ethylenically unsaturated hydrocarbons or olefins such as ethylene as illustrated in the example above, propylene, butene-1, heptene-1, octadecene-1, dodecene-1, 3-methylbutene, 4-methylbutene-1, styrene, vinyl cyclohexene and the like either alone, with each other, or with other monomers, especially diolefins such as butadiene, isoprene, piperylene, cyclopentadiene, 1,4-pentadiene and the like.

As mentioned previously, the Ziegler catalysts useful for the polymerization of the monomers mentioned in the foregoing paragraph are those comprising the product formed from the reaction of a compound of a transition metal selected from Group IV–B, V–B or VI–B of the Periodic Table of the elements with a metallic reducing agent. Preferably, the transition metal compounds employed are the compounds of titanium and zirconium with the halides being especially preferrd although oxyhalides, organic salts or complexes of these elements can be used. The titanium or zirconium in the compounds employed should be in a valence form higher than the lowest possible valence. The tetrahalides, trihalides, mixtures of di-, tri-, and tetrahalides, etc., can be used. Titanium or zirconium compounds other than the halides which can be employed include alcoholates, alkoxides or esters such as titanium tetramethoxide (also called tetramethyltitanate), titanium triethoxide, tripropoxytitanium chloride, zirconium tetra-n-butoxide, or complexes such as zirconium acetylacetonate, K$_2$TiF$_6$ or salts or organic acids such as the acetates, benzoates, etc., of titanium and zirconium.

Preferred as metallic reducing agents are organoaluminum compounds such as triethylaluminum, tributylaluminum, triisobutylaluminum, tripropylaluminum, triphenylaluminum, trioctylaluminum, tridodecylaluminum, dimethylaluminum chloride, diethylaluminum chloride, dipropylaluminum fluoride, diisobutylaluminum chloride, diisobutylaluminum hydride, diethylaluminum chloride and the like. Mixtures of the foregoing types of aluminum compounds can also be employed. The total reaction mixtures obtained in the formation of such compounds, i.e., by treatment of metallic aluminum with alkyl halides resulting in the formation of such mixtures as dialkylaluminum halides plus monoalkylaluminum dihalides, termed alkylaluminum sesquihalides, are also suitable. In addition to the organoaluminum compounds organometallic compounds of magnesium or zinc can be used. Also suitable are other reducing agents such as alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters or boronic acid esters and the like.

As employed commercially, such Ziegler catalysts are preferably formed by the reaction of titanium tetrachloride with an aluminum compound selected from the class consisting of aluminum alkyls, alkyl alkylaluminum halides and alkylaluminum hydrides. However, the process of the present invention is not limited in its applicability to polymerization processes in which such preferred Ziegler catalysts are employed.

For convenience, the two streams of catalyst complex employed in the process of the invention are distinguished by reference to them as "a first stream" and a "second stream" of catalyst complex. The so-called "first" complex stream is one, as stated previously, having an Al/Ti ratio between 2.2 and 4.0. Preferably, this stream has an Al/Ti ratio around 3.0. While the "second" complex stream may have an Al/Ti ratio in the range from 0.5 to 0.8, best results are obtained when the Al/Ti ratio of this stream is about 0.6.

In the preferred embodiment of the invention, the first and second catalyst complex streams are individually prepared, and allowed to age during mixing for from 3 to 12 minutes after which they are combined. Preferred aging times, i.e., dwell times in the complexer, are those in the range from 4 to 7 minutes. Best results are obtained with 10% by weight of the first catalyst complex stream and 90% by weight of the second complex stream although these proportions may be varied to include as much as 20% or as little as 5% of the first complex stream and proportionately the amount of the second complex stream may vary from 80% to 95% by weight of the total catalyst fed.

The catalyst complex streams may be prepared in any manner in suitable conventional equipment which provides for adequate mixing or dispersion of the catalyst constituents in an inert liquid medium. The inert liquid slurrying medium or diluent for conveying the individual catalyst ingredients into the complexer is preferably but not necessarily the same as that used for suspending the catalyst complex in the polymerization reactor or zone. Preferably, this is hexane but it may be any of the diluents mentioned below as suitable reaction media for the polymerization.

Complexing temperature is kept at about 30° C. by controlling the temperature of the cooling water flowing through the jacket of the complexer vessel. However, the temperature at which complexing is effected is not critical. Any temperature from about 10° to about 60° C. is satisfactory.

The pressure of the complexer is not controlled separately. The complexer pressure is simply the total of the reactor pressure which is controlled and the pressure drop in the catalyst complexer feed lines to the reactor. Pressures from 0 to 200 p.s.i.g. are suitable.

The catalyst is suspended for the polymerization reaction in an inert liquid reaction medium or diluent sometimes referred to as a liquid slurrying medium. Preferably, the diluent should be low-boiling so that trace amounts left on the polymers can be removed conventionally in a drying step. Suitable for use as inert liquod reaction media or diluents are saturated aliphatic and alicyclic hydrocarbons, aromatic hydrocarbons, halogenated hydrocarbons, and saturated ethers. Of these, the hydrocarbon solvents such as pentanes, n-hexane, n-heptane, n-octane and the various isomeric hexanes, heptanes and octanes, cyclohexane, methylcyclopentane, dodecane and industrial solvents composed of saturated and/or aromatic hydrocarbons such as kerosene, naphthas and the like are more generally used, with the saturated aliphatic hydrocarbons having from about 5 to 12 carbon atoms being preferred. However, benzene, toluene, ethylbenzene, cumene, decalin, ethylene dichloride, chlorobenzene, diethyl ether, orthodichlorobenzene, dibutyl ether and the like can be used. The quantity of liquid reaction medium or diluent used is subject to substantial variation. The amount may be kept low in the reaction mixture such as from 0.1 to 0.5 part by weight of diluent per part by weight of total polymer produced. However, it is often helpful in obtaining sufficient contact between monomer and catalyst and in aiding removal of heat of reaction to employ larger amounts of the inert liquid suspending medium or diluent, for example, from about 4 to about 30 parts by weight of the liquid or diluent per part by weight of total polymer produced.

Molecular weight control agents such as hydrogen, acetylene, diethyl zinc and the like may be introduced into the polymerization zone to modify or control the molecular weight of the polymer in the conventional manner and amount.

If desired, a reactive orangic oxygen compound can be employed to modify the characteristics of the catalyst so as to result in a narrowing of the molecular weight distribution of the polymer product. Such compounds are, in general, compounds containing active oxygen-containing functional groups such as, for example, alcohols, ketones, aldehydes and organic acids. They are generally added to the dispersion of the Ziegler catalyst in an inert organic liquid but they can be added to the polyvalent reducible metal compound, an essential component of the Ziegler catalyst, and this compound then reacted with the reducing agent, the other essential component, to produce an active Ziegler catalyst.

In general, the amount of the reactive organic compound to be employed is in the neighborhood of 0.4–1.0 gram-mole/gram-atom of the multivalent metal in the metal compound that is reduced in preparing the catalyst, for example, TiCl$_4$. The amount of a reactive organic oxygen compound to be employed is best related to the amount of catalyst and will vary considerably depending upon the particular catalyst, its method of preparation, the particular reactive organic compound and the extent to which catalyst modification is desired. For each mole of the heavy metal compound which is reduced, when the said compound contains one atom of metal per molecule, the amount of a reactive organic compound to be used will generally be within the range of 0.1–2 moles. With Ziegler catalyst prepared by the interaction of disobutylaluminum hydride with titanium tetrachloride, there is generally used an amount of reactive organic oxygen compound within the range of from 0.1 to 1.5 moles per mole of TiCl$_4$ used, that is, per gram-atom of titanium.

Generally preferred as the reactive organic oxygen compound are alcohols although phenols can be employed as well. Suitable alcohols include all aliphatic, alicyclic, aromatic and heterocyclic alcohols. The aliphatic alcohols such as methanol, ethanol, n-propanol, isopropanol alcohol, isobutanol, pentanol, octanol and the like especially suitable with isobutanol as the preferred modifier. Various other suitable alcohols are listed in U.S. patent 3,163,611 describing the modification of the Ziegler catalyst herein disclosed.

The amount of catalyst required is comparatively small. Generally, amounts from 0.1 to 5.0% by weight based on the total weight of monomer charged are satisfactory although amounts as small as 0.01% are sometimes permissible and larger amounts up to, say 20% can be employed.

The polymerization reaction can be conducted over a wide range of temperatures from 0° to 100° C. and higher if desired. Preferably, reaction temperature is maintained at about 65–90° C. Likewise, while atmospheric is preferred, subatmospheric or superatmospheric pressures can be used. The applicability of the present process is not limited to any special catalyst, or catalyst suspending medium or particular conditions of temperature and pressure under which the polymerization reaction itself is carried out.

In practicing the process of the present invention, any anhydrous or substantially anhydrous (i.e., containing 25 parts of water per million parts of alcohol) alkyl alcohol containing from 1 to 8 carbon atoms can be employed for quenching or destruction of the catalyst after the polymerization is complete and before separation of the polymer from the reaction mixture. Of the suitable alcohols which include methyl alcohol, ethyl alcohol, propyl alcohol, isobutyl alcohol, amyl alcohol, hexyl alcohol, octyl alcohol, and the like, methyl alcohol is the preferred quenching agent. The amount of alcohol used for quenching is critical only in the sense that it must be sufficient to destroy completely all catalyst activity and may be varied widely from about 1% to about 300% of the weight of the reaction mixture or polyolefin slurry being treated. The optimum amount for use will vary according to the quantity of catalyst present in the polymerizate. Generally, amounts from about 5% to about 25% by weight of the polymer slurry are satisfactory but the amount can be controlled as desired to provide an amount of alcohol sufficient to form a slurry of satisfactory fluidity while remaining within the bounds of economical operations.

The quenching operation and recovery of the polymer may be carried out according to well known conventional procedures but is preferably conducted in the manner described and claimed in U.S. Pat. No. 3,371,078 in order to insure that the greater part of the catalyst residues are removed from the polymer to render it less subject to color degradation on further processing.

What is claimed is:

1. A process for producing polyethylene having improved properties for processing into bottles which comprises polymerizing ethylene in the presenec of hydrogen in a polymerization zone in an inert liquid reaction medium at polymerization temperatures in contact with a catalyst which is formed by combining from about 5 to about 20% by weight of a first stream of a complex comprised of an alkylaluminum hydride and titanium tetrachloride, the mole ratio of said alkylaluminum hydride to said titanium tetrachloride being in the range of 2.2 to 4, and from about 95 to about 80% by weight of a second stream of a complex comprised of an admixture of an alkylaluminum hydride and titanium tetrachloride, the mole ratio of said alkylaluminum hydride to said titanium tetrachloride being in the range from about 0.5 to about 0.8, the aging time in prepartion of said complexes being in the range from 3 to 12 minutes, and feeding said combined stream continuously to said polymerization zone.

2. The process of claim 1 wherein said inert liquid reaction medium is hexane.

3. The process of claim 2 wherein said alkylaluminum hydride is diisobutylalumnum hydride.

4. The process of claim 3 wherein the aluminum-titanium ratio in said first complex stream is approximately 3.0 and the aluminum-titanium ratio in said second complex stream is approximately 0.6.

5. The process of claim 4 wherein said first complex stream constitutes about 10% by weight of the catalyst and said second catalyst complex constitutes about 90% by weight of the catalyst.

References Cited

UNITED STATES PATENTS

| | | | |
|---|---|---|---|
| 3,179,720 | 4/1965 | Hillmer | 260—897 A |
| 3,491,073 | 1/1970 | Marinak | 260—88.2 A |
| 3,136,737 | 6/1964 | Kampschmidt | 260—94.9 B |
| 3,328,381 | 6/1967 | Borman | 260—897 A |

JOSEPH L. SCHOFER, Primary Examiner

A. HOLLER, Assistant Examiner

U.S. Cl. X.R.

260—88.2 B, 897 A